United States Patent [19]

Mizusawa

[11] 4,435,111

[45] Mar. 6, 1984

[54] NUT

[75] Inventor: Akira Mizusawa, Fujisawa, Japan

[73] Assignee: Nifco Inc., Yokohama, Japan

[21] Appl. No.: 282,837

[22] Filed: Jul. 13, 1981

[30] Foreign Application Priority Data

Jul. 15, 1980 [JP] Japan .............................. 55-98744[U]

[51] Int. Cl.³ ............................................ F16B 37/16
[52] U.S. Cl. ...................................... 411/437; 411/21
[58] Field of Search ..................... 411/437, 435, 21, 22

[56] References Cited

U.S. PATENT DOCUMENTS

| | | | |
|---|---|---|---|
| 874,019 | 12/1907 | Moore | 411/437 |
| 2,378,957 | 6/1945 | Tinnerman | 411/437 |
| 2,401,672 | 6/1946 | Tinnerman | 411/437 |

OTHER PUBLICATIONS

IBM Technical Disclosure Bulletin, vol. 20, No. 3, S 7501, Aug. 1977; "Push-On Nut"; M. Henry.

*Primary Examiner*—Wayne L. Shedd
*Attorney, Agent, or Firm*—Trexler, Bushnell & Wolters

[57] ABSTRACT

A plastic nut comprises a cylindrical body incorporating in the tubular wall thereof resilient pieces provided on the inner surfaces thereof with check screw threads. When an ordinary bolt is simply pushed in the nut, the check screw threads of the nut engage themselves inseparably with the screw threads on the bolt. The union thus formed is retained strongly and lastingly. Dissolution of this union is obtained by rotating the nut around the bolt.

3 Claims, 7 Drawing Figures

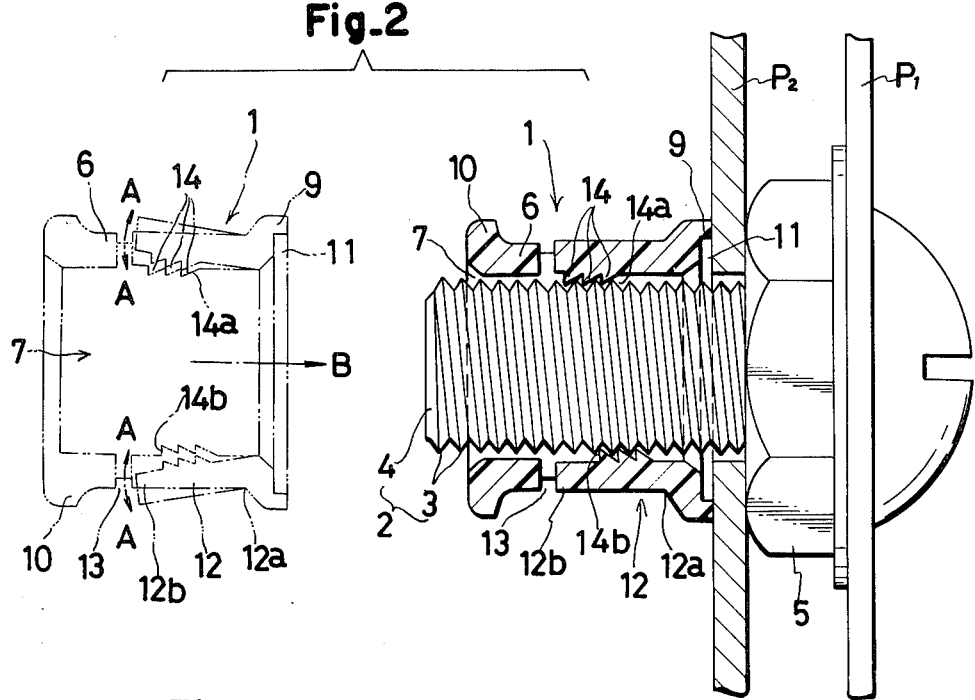
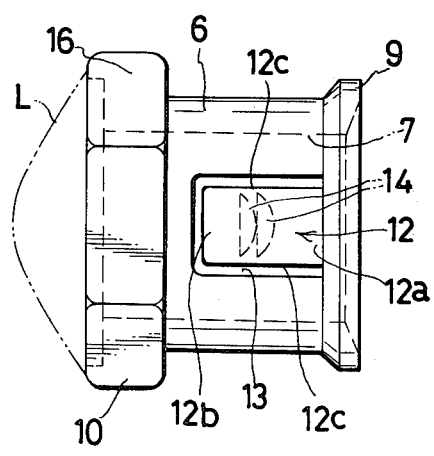
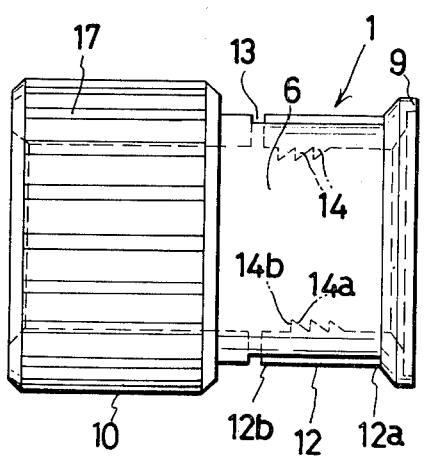

NUT

BACKGROUND OF THE INVENTION

This invention relates to improvements in and concerning nuts to be engaged with bolts.

Bolts and nuts are basic, commonplace devices which have found extensive utility from long ago as means for securing articles in position or against each other. Because their constructions have long been accepted as things quite conventional, no radical improvements have ever been made thereto.

Among other fastening devices, bolts and nuts are used especially in applications for which the articles secured thereby against each other would cause much inconvenience if they accidentally broke engagement because of an external force such as vibration. The reason is as follows: Once a nut is tightened onto a bolt across objects being fastened, if the nut becomes loose because of vibration, for example, it will not come off the bolt until it makes tens of complete rotations around the bolt. This means that it is practically impossible for the nut to come off the bolt and that there is only a remote possibility of the fastened objects completely separating from each other.

One advantage derived from the use of bolts and nuts is the fact that they fulfill an excellent function of maintaining the condition of their union in addition to establishing the union with great strength. Their major disadvantage, on the other hand, is that at the time the bolt and the nut are brought into fast union, they must be given tens of rotations relative to each other. The work often becomes onerous where nuts have to be screwed on a large number of bolts.

SUMMARY OF THE INVENTION

One object of this invention is to provide a nut which can be fastened to a bolt by a simple act of pushing to establish strong, lasting union.

To accomplish the object described above according to this invention, there is provided a nut which comprises a cylindrical body containing a hole for receiving a bolt in the axial direction, resilient pieces disposed in one portion of the cylindrical body and adapted to bend freely in the radial direction, and partial screw threads formed on the inner surfaces of the resilient pieces and adapted to be engaged in a checked condition with the screw thread on the bolt.

The partial screw threads formed on the inner surfaces of the resilient pieces have inclined faces on the side closer to the inlet of the receiving hole and, on the other side, upright faces perpendicularly intersecting the axis of the nut. Owing to this special design of the partial screw threads, the rod of the bolt can be easily inserted into the receiving hole of the cylindrical body. Once the bolt is so inserted in the nut, it cannot be drawn out of the nut. As occasion demands, however, the nut may be released from union with the bolt by being rotated around the bolt in much the same way as any other ordinary nut is separated from the mating bolt. The nut of this invention is characterized by being able to establish strong, lasting union with the bolt by the simple act of pushing.

The other objects and characteristics of this invention will become apparent from the further disclosure of the invention to be made hereinafter with reference to the accompanying drawing.

BRIEF DESCRIPTION OF THE DRAWING

FIG. 2 is a longitudinal section illustrating the nut and the condition in which the nut is fastened to its mating bolt.

FIG. 4 and FIG. 5 are plan views illustrating yet other embodiments of the nut of this invention.

DESCRIPTION OF THE PREFERRED EMBODIMENTS

Figure 1:
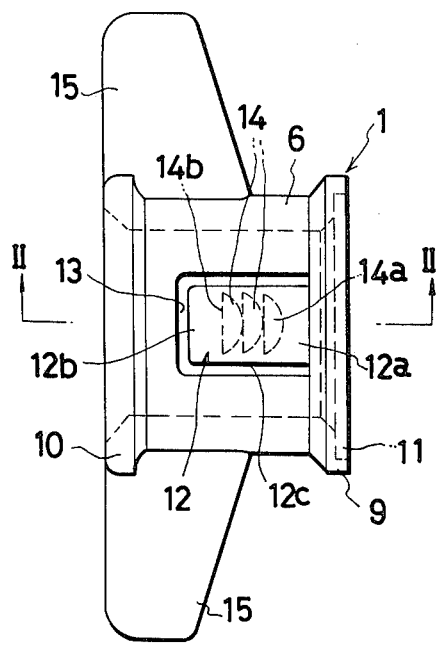
FIGS. 1(A), (B), and (C) are a plan view, side view and rear view respectively of one embodiment of the nut of this invention.
Figure 1:
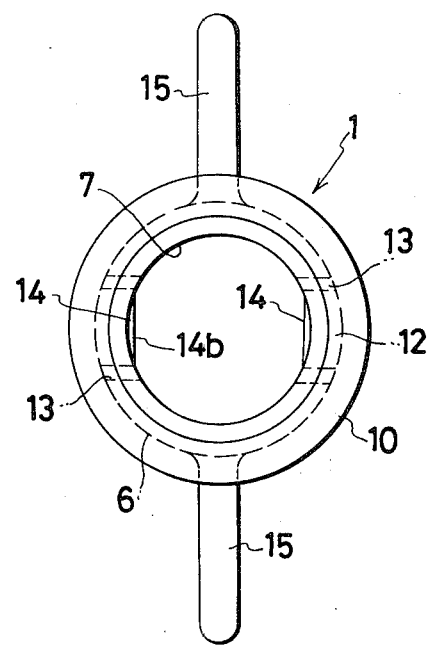
Figure 1:
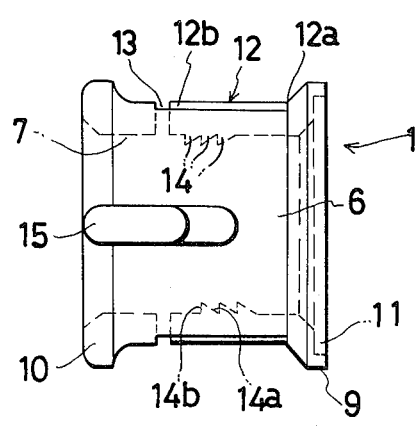

This invention relates to a plastic nut which can be fastened to a bolt of any ordinary construction by a simple act of pushing.

All the component members, to be described below, of the nut 1 of the first embodiment of this invention illustrated in FIGS. 1(A)–(C) and FIG. 2 are integrally formed by injection molding a plastic material.

The bolt 2 which is mated with the nut 1 is a bolt of very ordinary type which is not required to be specifically modified in any way for the sake of this invention. It is only required to possess a rod 4 provided with an ordinary screw thread 3. No particular material is specified for this bolt. For the convenience of description, the present embodiment is assumed to represent a case in which a first panel $P_1$ is secured by means of ordinary metal bolt 2 and metal nut 5 and a second panel $P_2$ is fastened to the first panel $P_1$ by means of the bolt 2 and the nut 1 of the present invention. This is not the only condition which permits effective use of the nut of this invention. In virtually all applications for which conventional nuts are found usable, the nut 1 of this invention can be applied with substantially no alteration.

The main part of the nut 1 is a cylindrical body 6 having an axial hole 7 for receiving a bolt rod. The inside diameter of this insertion hole 7 is equal to or slightly greater than the diameter of the rod 4 of the mating bolt, so as to permit rather easy insertion of the rod 4. The cylindrical body 6 has an annular section and, in the present embodiment, has a slightly increased diameter at the opposite axial ends 9, 10. Particularly, the axial end 9 of increased diameter of the righthand side in the diagrams of FIG. 1(A), (B) contains an empty space of an increased diameter communicating with the receiving hole 7 for the bolt rod. Consequently, the axial end 9 has the shape of a relatively flexible flange. The flange-shaped axial end 9 constitutes the forward end of the nut relative to the direction in which the bolt rod 4 is received for insertion in the nut. Hereinafter, it is referred to as "front end 9", while the opposite end 10 is referred to as the rear end. The directions, forward and rearward, of other component parts are defind according to the same principle.

In at least one portion, specifically at two diametrically opposite positions in the present embodiment, in the circumferential direction of the cylindrical body 6 serving as the outer wall surrounding the bolt rod receiving hole 7, there are disposed resilient pieces 12 flexible inwardly and outwardly in the radial direction relative to the bolt rod inserting hole 7. As described more fully later, several ways are conceivable for the formation of these resilient pieces 12. In the present embodiment, they are formed by cutting slits each substantially in the shape of the letter U at the stated positions of the cylindrical body 6 thereby allowing only the front ends of the formed resilient pieces 12 (i.e. the portions enclosed within the U-shape slits) to remain connected to the other portions of the cylindrical body or to the adjoining parts of the front ends 9, and the rear ends 12b to constitute free ends. To be more specific, in the present embodiment, the resilient pieces 12 extend toward the rear free ends 12b from the front ends 12a serving as hinges, whereby the resilient pieces as a whole are allowed to bend freely inwardly and outwardly in the radial direction (indicated by the arrow A—A in FIG. 2) about the hinges.

On the inner surfaces of the resilient pieces 12 bordering on the bolt rod receiving hole 7, one or more, three specifically in the present embodiment, partial screw threads 14 each of the shape of a check claw are disposed in the axial direction. The pitch separating the individual screw threads in each resilient piece and the deviation in the axial direction between the screw threads on one resilient piece and those on the other resilient piece are adjusted to be correctly meshed with the pitch of the screw threads 3 on the mating bolt. Unlike other ordinary screw threads, the screw threads 14 have their front faces 14a inclined at an angle and their rear faces 14b raised upright.

To ensure convenient separation of this nut from the bolt, at two diametrically opposite positions of the cylindrical body 6, i.e. at positions selected so as to avoid interference with the motion of the resilient pieces 12, there are disposed pinches 15 protruding outwardly in the radial direction. Thus, the nut assumes the overall appearance of a butterfly nut.

The nut of the construction described above is fastened to the mating bolt as illustrated in FIG. 2. First, the front opening of the receiving hole 7 of the nut 1 is closely opposed to the bolt rod 4 as shown by the chain line in FIG. 2 and inserted over the leading end of the bolt rod 4 (as shown by the arrow B), and then the nut 2 is pushed in one motion in the direction of the base of the bolt rod or the second panel P$_2$ being fastened in the present embodiment. During the advance of the nut relative to the bolt rod, the screw threads 14 protruding into the receiving hole 7 of the nut collide with the screw threads 3 on the bolt rod 4. Since the faces (front faces) 14a of the screw threads 14 taking part in the collision are inclined an angle as described above, the resilient pieces 12 are bent outwardly in the radial direction each time these screw threads 14 ride over the opposed screw threads 3 of the bolt rod, permitting the nut to continue its advance.

Figure 3:
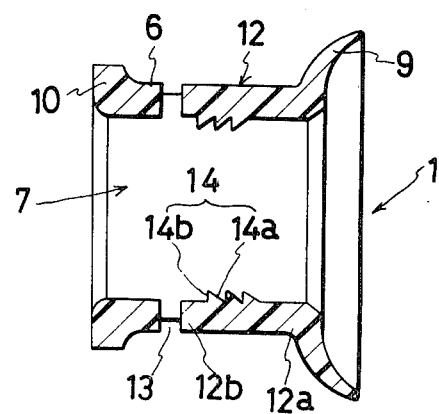
FIG. 3 is a longitudinal section illustrating another embodiment of the nut of this invention.

The push of the nut 1 is stopped after the front end 9 of the nut collides with the panel P$_2$. Then, the screw threads 14 of the resilient pieces engage themselves with the screw threads 3 of the bolt to which they happen to be opposed at the time the push is discontinued. The union of the nut to the bolt and the consequent fastening of the panel P$_2$ are thus completed. Particularly when the front end 9 of the nut is formed in the shape of a flange by suddenly increasing the diameter of the hole to insert a stepped portion at 11 as in the present embodiment, this flange-shaped front end provides flexibility by means of which the nut can be given a further push equivalent to one or two pitches of the screw threads after the nut has collided with the panel P$_2$. The flange-shaped front end 9 is thus caused to exert an elastic force and enhance the binding force working between the nut and the bolt. If this function is desired to be intensified, then additional binding force may be obtained by forming the front end 9 in the shape of a suction disc possessing conspicuous resilience as in the embodiment of FIG. 3.

The nut of this invention excels in the ability to retain the union as well as in the strength of the union itself. If an unexpected force is exerted in the direction opposite the direction of insertion (opposite the direction of the arrow B) after in FIG. 2, the nut has been brought into perfect union with the bolt, since the screw threads 14 of the resilient pieces have their upright faces 14b kept in fast contact with the screw threads 3 standing immediately behind, the resilient pieces are not allowed to bend outwardly as when the inclined faces 14a ride over the screw threads 3 during the insertion of the nut around the bolt rod. The fast contact, accordingly, quite effectively withstands the external force exerted as described above. Particularly in the present embodiment, the resilient pieces have their respective front ends 12a function as their hinges. When a force tending to pull the nut off the bolt is exerted and, consequently, the inclined faces (flanks) of the screw threads 3 on the bolt exert a relative force to bear on the upright rear faces 14b of the screw threads 14, there is produced a force tending to bend the resilient pieces 12 in the inward radial direction. Consequently, the screw threads 14 are pushed further into the grooves between the screw threads 3 of the bolt so that the force of the union between the nut and the bolt is all the more enhanced. This is an ideal effect of the nut of this invention.

When such strong force of union and such ability to ensure lasting union are not required, the resilient pieces 12 may be formed so that the rear ends 12b thereof continue into the cylindrical body 6 and serve as hinges and the front ends 12a thereof constitute free ends. Alternatively, the resilient pieces may be formed in such a manner that either of the two lateral sides 12c continues into the cylindrical body 6 and the other lateral side 12c extends as the free end in the circumferential direction of the nut.

Of course, use of at least one resilient piece 12 suffices for the purpose of this invention, although the present embodiment has been described as involving use of two resilient pieces 12. Conversely, the number of resilient pieces 12 may increased to three (circumferentially spaced at fixed intervals of 120°) or to four (similarly spaced at fixed intervals of 90°). Further, the number of screw threads 14 on each of the resilient pieces can be selected freely.

When the nut 1 is required to be removed from the bolt for some reason or other, the dissolution of the union can be obtained by turning the nut in much the same way as any other ordinary nut is removed, with the finger tips pressed against the pinches 15. In applications which do not specifically necessitate removal of the nut, no use is found for twisting means such as pinches 15 of the present embodiment. Even in applications which do necessitate removal, provision, as in the embodiment of FIG. 4, of a member 16 with a hexagonal section such as an ordinary hexagon nut which permits convenient use of a spanner or wrench or provision, as in the embodiment of FIG. 5, of a knurled knob 17 which ensures smooth rotation by finger tips may be used.

There are applications in which the bolt rod receiving hole 7 is not required to be a through hole. Instead, it may be a blind hole like that of an ordinary box nut which is closed on the rear end relative to the direction of the insertion of the bolt rod as indicated by the chain line L in FIG. 4. In the diagrams of the various embodiments, like component members are denoted by like numerical symbols.

As described above, the nut of the present invention is fastened with the bolt by a very simple operation. Despite this simplicity of the fastening work, the union so formed is retained powerfully and lastingly. As a highly efficient machine element, the nut is expected to find extensive utility in applications in numerous industrial branches.

What is claimed is:

1. A nut molded integrally of a plastic material and adapted for engagement with a bolt rod, which nut comprises a cylindrical body possessing a receiving hole for admitting the bolt rod in the axial direction and having circumferentially continuous cylindrical end portions at both ends of said body, at least one resilient tab formed in one portion of sayd cylindrical body in such a manner that said at least one resilient tab is integral on one side thereof with said cylindrical body adjacent the receiving end of said body and is flexible in the radial direction of the nut, and partial screw threads formed on the inner surfaces of said at least one resilient tab bordering on said receiving hole and adapted to be meshed with the screw threads on said bolt rod.

2. The nut according to claim 1, wherein the screw threads formed on the at least one resilient tab have inclined front faces and upright rear faces respectively relative to the direction of the insertion of the nut on the bolt rod.

3. The nut according to claim 1 or claim 2 and further including a resilient flange extending axially and radially from said body at the receiving end of said body.

* * * * *